United States Patent
Warburton et al.

(10) Patent No.: US 12,399,524 B2
(45) Date of Patent: Aug. 26, 2025

(54) DESKEW AND CLOCK DOMAIN CROSSING FOR MULTILANE LINK

(71) Applicant: Arista Networks, Inc., Santa Clara, CA (US)

(72) Inventors: Liam Toby Warburton, East Ryde (AU); Marc Durrenberger, Belrose (AU); Shih-Chien Chang, Chiswick (AU)

(73) Assignee: Arista Networks, Inc., Santa Clara, CA (US)

( * ) Notice: Subject to any disclaimer, the term of this patent is extended or adjusted under 35 U.S.C. 154(b) by 111 days.

(21) Appl. No.: 18/517,207

(22) Filed: Nov. 22, 2023

(65) Prior Publication Data

US 2025/0165027 A1    May 22, 2025

(51) Int. Cl.
  *G06F 1/10* (2006.01)
  *G06F 1/12* (2006.01)
(52) U.S. Cl.
  CPC . *G06F 1/12* (2013.01); *G06F 1/10* (2013.01)
(58) Field of Classification Search
  CPC .................................... G06F 1/12; G06F 1/10
  See application file for complete search history.

(56) References Cited

U.S. PATENT DOCUMENTS

| | | | |
|---|---|---|---|
| 7,454,537 B1* | 11/2008 | Xue | H04L 25/14 713/400 |
| 9,474,034 B1* | 10/2016 | Baumgartner | H04W 24/08 |
| 2002/0112099 A1* | 8/2002 | Collier | H04L 25/14 710/1 |
| 2014/0325107 A1* | 10/2014 | Iwatsuki | G06F 13/4022 710/124 |
| 2016/0373198 A1* | 12/2016 | Natsukawa | H04L 69/03 |

* cited by examiner

*Primary Examiner* — Phil K Nguyen
(74) *Attorney, Agent, or Firm* — Sprinkle IP Law Group (57) ABSTRACT

Systems and methods for communicating data via a multilane data link from a first clock domain to a second clock domain, where the data streams of a multilane link are clocked into FIFO deskew buffers using clock signals that are recovered from the data streams themselves. Each data stream is clocked into the deskew buffer with the clock signal recovered from that data stream. The data is clocked out of the deskew buffers using the clock signal of a target clock domain so that the data streams clocked out of the deskew buffers are synchronized with each other and with the clock signal of the target clock domain (the target clock signal) to eliminate the need for a separate clock domain crossing buffer.

20 Claims, 6 Drawing Sheets

FIG. 7

DESKEW AND CLOCK DOMAIN CROSSING FOR MULTILANE LINK

TECHNICAL FIELD

The disclosed embodiments relate generally to data communication between devices and, more particularly, to systems and methods for communicating data via a multilane data link from a first clock domain to a second clock domain.

BACKGROUND

Data is commonly transmitted from one device to another, where the devices are independently clocked (i.e., they have different clock domains) so the data within each device is processed using a different clock signal. When data is transmitted from one clock domain to another, the data has to be processed to cross from the first domain to the second domain (i.e., to synchronize the data with the second domain's clock signal).

The problem of crossing clock domains is further complicated when data is communicated between the devices using a multilane data link. In a multilane link, data is clocked onto the multiple physical lanes of the link using a single clock signal of a first clock domain. As the data travels along the different lanes, the physical differences between the lanes (e.g., potentially different physical lengths of the lanes) cause the signals on the different lanes—which were originally all synchronized to the first clock signal—to become skewed (out of phase) with respect to each other. It is therefore necessary for the receiving device to deskew the signals with respect to each other, as well as to synchronize the received data to the local clock domain of the receiving device.

In conventional devices, the data signals on the different lanes of the multilane link are used to recover corresponding skewed clock signals. Each recovered clock signal is used to clock the data of the corresponding lane into a corresponding FIFO deskew buffer. A first one of the recovered clock signals is then used to clock data out of all of the deskew buffers so that the data signals received on the different lanes of the multilane link are synchronized with each other (deskewed), but not with the destination clock signal. The synchronized data signals from the different lanes of the multilane link are multiplexed (reordered or descrambled) by logic clocked with the first clock signal to form a single combined data stream synchronized with the first one of the recovered clock signals. The combined data stream is clocked into a FIFO clock crossing buffer using the first clock signal. Finally, the combined data stream is clocked out of the clock crossing buffer using the clock signal of the second clock domain so that it can be provided to any of the device components residing in the second clock domain.

It is important in many instances to minimize the latency of the data crossing from the first clock domain to the second clock domain. For example, in a financial context, orders for stock trades are handled in the order they are received, so if data for a trade order is received even a single cycle ahead of a second order, the first order will be processed first, which is advantageous. The disclosed embodiments described below provide a technical advantage over previous devices by reducing the number of processing cycles that are required for deskewing and clock domain crossing when transmitting data over a multilane link.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

In the disclosed embodiments, the data streams of a multilane link are clocked into FIFO deskew buffers in the same manner as conventional systems using the clock signals recovered from the data streams. In other words, for each data stream, a corresponding clock signal is recovered, and the clock signal recovered for a particular data stream is used to clock that data stream into a corresponding deskew buffer. Each data stream is clocked into the deskew buffer with the clock signal recovered from that data stream because each of the data streams may have become skewed with respect to the other data streams (i.e., the data streams and the corresponding recovered clock signals may be out of phase with each other).

For the purposes of this disclosure, "clocking" data into a buffer with a particular clock signal means using the clock signal to determine the value of the data signal at specific points in time defined by the clock signal (normally a rising edge or a falling edge of the clock signal) and storing the values at the defined points in time in the buffer. Similarly, "clocking" data out of a buffer with a particular clock signal means reading data values out of the buffer at specific points in time defined by that particular clock signal. The clock signal that is used to clock data into a buffer need not be the same as the clock signal that is used to clock data out of the buffer.

In the disclosed embodiments, the data streams that have been clocked into the deskew buffers using clock signals that are recovered from the data streams. The data is clocked out of the deskew buffers using the clock signal of a target clock domain rather than one of the recovered clock signals, as is done in conventional systems. The result is that the data streams clocked out of the deskew buffers are synchronized with the clock signal of the target clock domain (the target clock signal).

Since the data streams are clocked out of the deskew buffers using the target clock signal, the data streams (which correspond to the different lanes of the multilane link) are synchronized with each other as well as the target clock signal. The synchronized data streams from the different lanes of the multilane link are multiplexed (reordered/descrambled) by logic which is also clocked by the target clock signal to form a single combined data stream which is synchronized with the target clock signal.

Because the data was clocked out of the deskew buffers and reordered by logic using the target clock signal, the combined data stream is already synchronized with the target clock domain, so there is no need to use a separate clock domain crossing buffer to achieve the clock domain crossing. The disclosed embodiments thereby eliminate the clock cycles which are required in conventional systems to process the data through the clock domain crossing buffer. Accordingly, the disclosed embodiments provide a latency advantage over conventional clock domain crossing systems.

It should be noted that, in general practice, modules are created that perform specific functions. These modules are then connected together to create designs with higher level functionality. Some modules may be used extensively throughout many designs and it is typically good practice to keep them as generic as possible to allow them to be widely used. Adding use case-specific functionality to modules often limits their re-usability in other designs, so this is often discouraged. It is typically preferred to piece together several modules with well-defined functionality to suit a particular use case, rather than to design a use case-specific module.

In the case of clock domain crossing, for example, there may be functions that need to be performed before doing the crossing. For instance, if a destination clock is slower than the recovered clock, it might be desirable to upconvert the re-assembled data onto a wider bus before crossing into the slower domain, so that the same bandwidth could be handled in the destination clock domain. In another instance, it might be desirable to detect errors in the data (e.g., mal-formed frames) and correct them before passing the data on to the downstream logic in the destination clock domain.

In the specific case of a multilane link, deskewing the lanes of the link is a requirement for re-assembling the data. This is an orthogonal task to crossing into a destination clock domain, which in many cases may not be required. For example, the application might be a loopback application where data is retransmitted on the recovered clock and does not need to cross to a destination clock at all. In another example, the application might require the data to be replicated to multiple destination clocks, in which case crossing to a specific one of the user clocks is no longer beneficial.

Following the common design approach, a specific module might already exist that performs tasks such as error detection and frame corrections or other processing before crossing into the destination domain. This module could be used in a variety of places, including multilane and single lane protocols of varying speeds. The use of these specific modules might mean that the user clock is not readily available or suitable for use by upstream modules.

The common design approach therefore teaches the use of generic modules that are useful in a wider range of applications. In the disclosed embodiments, the design of the clock domain crossing for the multilane link goes against the common design approach and foregoes the wider applicability of the design in order to reduce the number of cycles required for the clock domain crossing.

Figure 1:
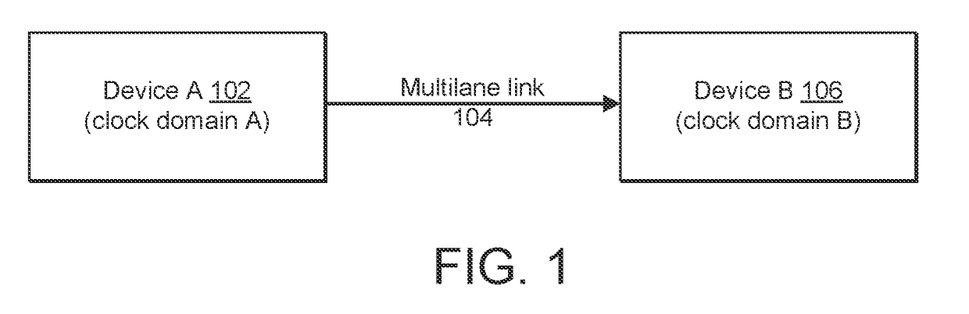
FIG. 1 is a diagram illustrating the communication of data from a first device via a data link to a second device in accordance with some embodiments.

Before describing the disclosed embodiments in detail, it may be helpful to consider the context in which they are implemented. Referring to FIG. 1, a diagram is shown to illustrate the communication of data from a first device 102 via a data link 104 to a second device 106. The logic components within first device 102 operate using a first clock signal and the data which is processed and communicated using this first clock signal is therefore considered to be within a first clock domain corresponding to this clock signal. Similarly, the logic components within second device 106 operate using a second clock signal and the data which is processed and communicated using this second clock signal is considered to be within a corresponding second clock domain.

For the purposes of this disclosure, since the data is transmitted from the first device and first clock domain to the second device and second clock domain, the first clock domain may be referred to as the source clock domain, and the second clock domain may be referred to as the destination or target clock domain.

Because the second clock signal is independent of the first clock signal, it may not be synchronized with the first clock signal. Typically, there is a phase difference between the clock signals of the two clock domains. This is illustrated in FIG. 2.

Figure 2:
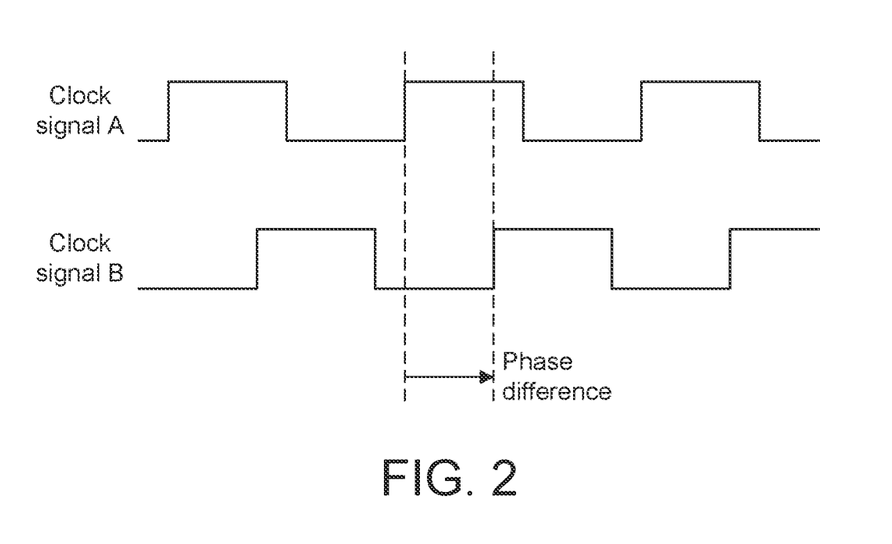
FIG. 2 is a diagram illustrating the relationship between a source clock signal and a target clock signal in accordance with some embodiments.

FIG. 2 depicts a source clock signal 202 and a target clock signal 204. In this example, target clock signal 204 is advanced by a phase difference, with respect to source target signal 202. Since the clock signals are independent, the phase difference may be from 0° to 360°. It should be noted that, even if the phase difference is 0°, the phase difference is unknown, so it is necessary to provide a mechanism for crossing from the source clock domain to the target clock domain, even if in some instances there is no actual phase difference between the clock signals. It should be noted that, because each device derives its clock signal from its own oscillator, manufacturing and environmental factors may cause source clock signal 202 and target clock signal 204 to have a small frequency difference (on the order of a few parts per billion). The differences in the frequencies may also change over time. Because the frequency differences are very small (on the order of a few parts per billion), they will be ignored for the purposes of this disclosure.

Figure 3:
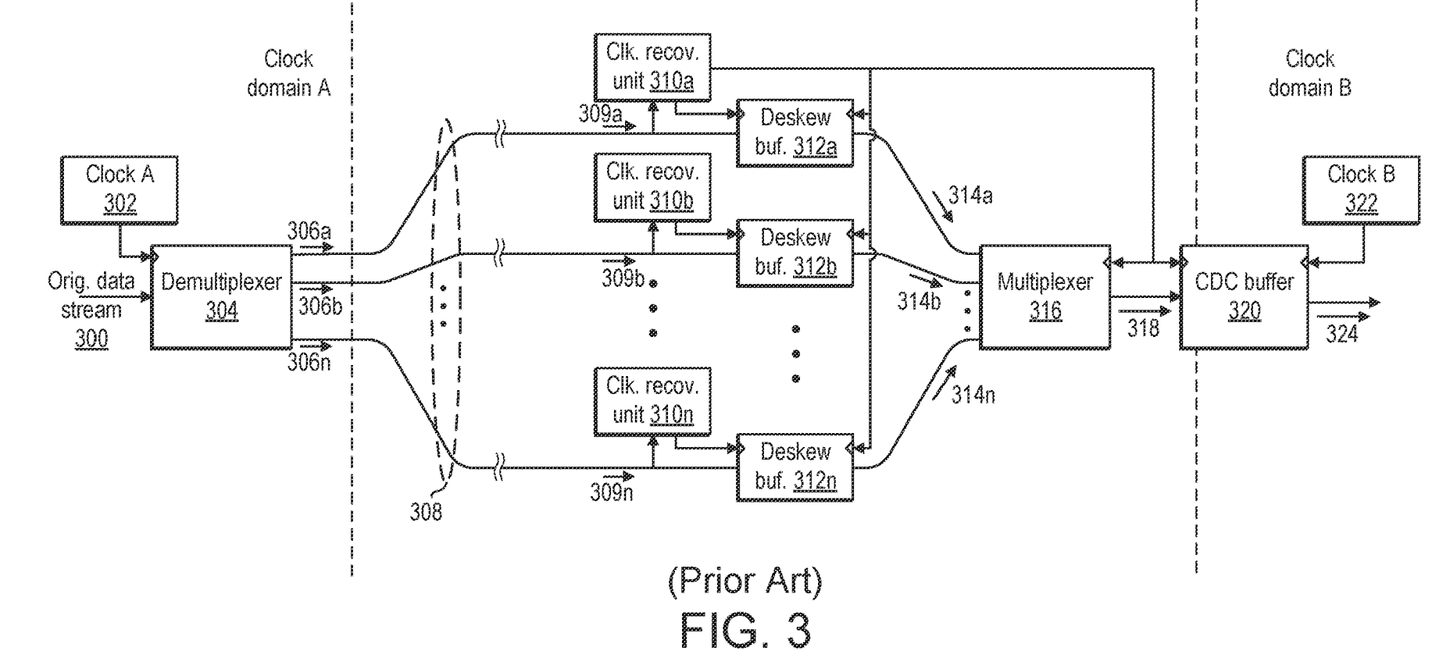
FIG. 3 is a diagram illustrating an example clock domain crossing mechanism in accordance with the prior art.

In order to better understand the disclosed embodiments, it will be helpful to first describe the structure of a conventional clock domain crossing mechanism. Referring to FIG. 3, an example clock domain crossing mechanism in accordance with the prior art is shown. In this example, data is communicated from a first (source) clock domain of a first (source) device to a second (target) clock domain of a second (target) device. The data is communicated via a multilane data link.

The data is originally in the form of a single data stream 300. This data stream is provided to a demultiplexer 304 which receives a source clock signal from source clock 302.

Demultiplexer 304 separates the data in original data stream 300 into multiple, separate data streams 306, each of which contains a part of the original data stream. Each of data streams 306 is transmitted on a corresponding lane of multilane link 308. Each lane is an individual channel for transmitting a corresponding data stream. The lanes of link 308 allow data streams 306 to be transmitted in parallel, thereby increasing the overall bandwidth of the link. For example, if each lane of multilane link 308 can carry 10 Gbps (gigabits per second) of data and there are four lanes, the multilane link is capable of carrying 40 Gbps.

It should be noted that different instances of the same or similar devices may be identified herein by a common reference number followed by a letter. For instance, as depicted in FIG. 3, this system generates data streams 306a-306n. The individual data streams may be referred to by the number and letter, or the data streams may be referred to generically or collectively by the number alone (e.g., data streams 306).

Ideally, the manufacturer of multilane link 308 attempts to construct the link so that each of the physical lanes of the link is identical, and the time required for data to transit the length of each lane is identical. In practice, however, there are at least minor differences between the physical lanes, so the time required to transit each lane is likely to be slightly different than the time required to transit the other lanes. Consequently, when each data stream is transmitted over the corresponding lane of multilane link 308, the phase of the data stream shifts with respect to the data streams transmitted over the other lanes. It is therefore necessary to synchronize each of the data streams 309 at the destination end of multilane link 308 so that they can be recombined (multiplexed) to reform the original data stream.

Data streams 309 are identical to data streams 306, except that they may have been phase-shifted due to the physical differences between the lanes of multilane link 308. Data streams 309 are synchronized by clocking the data streams into corresponding deskew buffers using recovered clock signals for each of the data streams, and then clocking the data out of the deskew buffers using a single, common clock signal.

Because each of data streams 309 may be out of phase with the others of data streams 309, it is necessary to clock the data of each data stream into the corresponding deskew buffer using a clock signal that matches the data stream. The system of FIG. 3 therefore includes a set of clock recovery units 310, each of which is connected to a corresponding lane of multilane link 308 At the receiving (delivery) end of the link (i.e., the end of the link which is connected to the target device).

Each clock recovery unit 310 receives the data stream 309 which is received on the corresponding lane and generates a clock signal that matches the data (i.e., a clock signal having transitions that are synchronized to the transitions of the data signal). This clock signal is provided to a first clock input of a corresponding deskew buffer 312 that is connected to the receiving end of the same link lane. The clock signal determines the timing with which the bits of the corresponding data stream 309 are clocked into (stored in) deskew buffer 312. The use of the recovered clock signal to clock the data into deskew buffer 312 ensures that the values of the individual bits are accurately determined and stored in the deskew buffer.

As noted above, because the data streams 309 may be out of phase with each other, the data stream transmitted over each individual lane of multilane link 308 is clocked into the corresponding deskew buffer using a clock signal that is recovered from that same data stream 309. Once the data of a particular data stream has been stored in the corresponding deskew buffer, it can be read out of the deskew buffer using any one of the recovered clock signals. In the example of FIG. 3, the clock signal recovered by clock recovery unit 310a from the first data stream 309a is provided to a second clock input of each of deskew buffers 312 and is used to clock the data out of the buffers.

Because the same recovered clock signal is used to clock data out of all of deskew buffers 312, the data streams 314 provided at the outputs of the deskew buffers are synchronized with this recovered clock signal. Data streams 314 are provided as inputs to multiplexer 316, which combines the data of data streams 314 to form a single data stream 318 which is identical to original data stream 300. Multiplexer 316 is also clocked by the recovered clock signal that is used to clock data out of deskew buffers 312, so data stream 318 is also synchronized with the recovered clock signal.

Because the recovered clock signal that clocks data out of deskew buffers 312 and through multiplexer 316 is independent of the target clock signal in the target clock domain, it is necessary to synchronize data stream 318 with the target clock signal. This is accomplished using a clock domain crossing buffer 320. Clock domain crossing buffer 320 receives data stream 318 at a data input and receives at a first clock input the recovered clock signal that is used to clock data out of deskew buffers 312 and through multiplexer 316. The recovered clock signal is used to clock the bits of data stream 318 into the clock domain crossing buffer.

Clock domain crossing buffer 320 also receives the target clock signal of the target clock domain at a second clock input. The target clock signal is provided by a target clock source 322. The target clock signal is used to clock the data out of clock domain crossing buffer 320 to produce an output data stream 324 which is identical to data stream 318 and original data stream 300, except that it is synchronized with the target/destination clock signal instead of the recovered clock signal. This completes the clock crossing of the data stream from the source clock domain to the target clock domain.

Referring to FIGS. 4A-4F, a series of diagrams are shown to illustrate the relative timing of the clock signals at the different stages of the clock domain crossing system of FIG. 3. Each diagram illustrates the timing of the data stream(s) with the various clock signals that are involved in the clock domain crossing.

It should be noted that, in each of these figures, as well as FIGS. 6A-6E, the rising edges of the clock signals define the transitions in the corresponding data signals. In alternative embodiments, the transitions may be defined by other features of the clock signals (e.g., the falling edges of the clock signals may define the transitions between bits represented by the corresponding data signals).

It should also be noted that, for the purposes of the examples shown in FIGS. 4A-4F and 6A-6E, the illustrated portions of the data streams represent alternating high and low values (0's and 1's). This is done to clearly illustrate the locations of the transitions between bits, and it will be understood by those skilled in the art that the bit values may be any series of bits which is appropriate to represent the data embodied in the data streams.

Figure 4A:
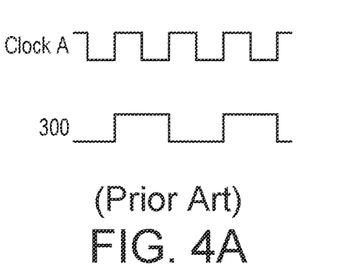
FIGS. 4A-4F are diagrams illustrating the relative timing of the clock signals at the different stages of the clock domain crossing system of FIG. 3.

Referring to FIG. 4A, the clock signal of the source domain and the data stream 300 that is to be transmitted from the source clock domain to the target clock domain are depicted. Clock signal A (the clock signal of the source clock domain) is provided by clock 302. It can be seen in the figure that data stream 300 is synchronized with clock signal A. Data stream 300 is input to demultiplexer 304, which is clocked by clock signal A.

Figure 4B:
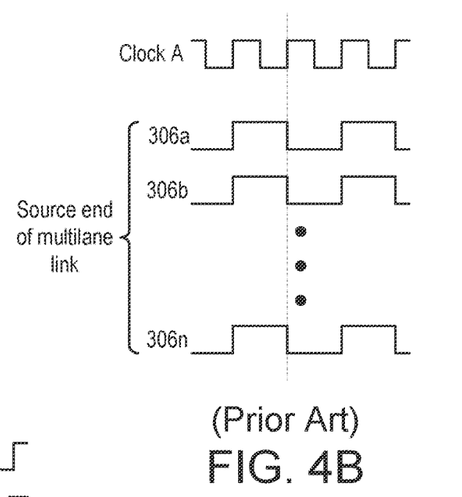

Referring to FIG. 4B, demultiplexer 304 processes received data stream 300 and separates the data of data stream 300 into a generated set of data streams 306a-306n. These data streams are also synchronized with clock signal A (as indicated by the dashed line which shows that the falling edges of clock signal A are temporally aligned with the bit transitions of the generated data streams). Demultiplexer 304 then puts the synchronized data streams 306a-306n on multilane link 308 for transmission to the second device, which uses a different clock signal (clock B) and defines a different clock domain.

Figure 4C:
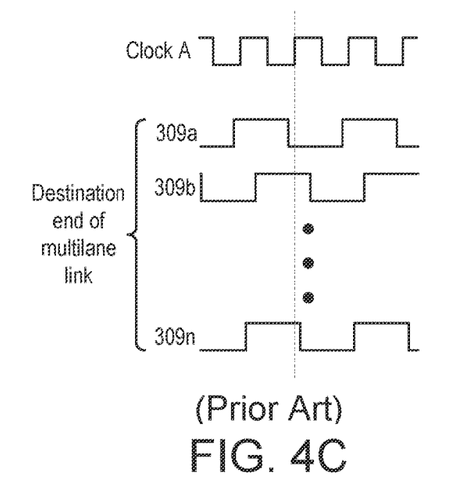

Thus, at the source end of the multilane link, each of data streams 306a-306n is synchronized as shown in FIG. 4B. Each of the data streams is transmitted via a different lane of the multilane link. Because it is very difficult to ensure that each of the lanes of the link is exactly the same, the data streams may experience phase shifts as they are transmitted over the respective lanes of multilane link 308. Consequently, when the data streams reach the destination end of the multilane link, the data streams may be out of phase with each other as shown in FIG. 4C. As depicted in this figure, the dashed line indicates the falling edge of clock signal A, and it can be seen that data stream 309a is delayed by a small amount from the clock signal, while data streams 309b and 309n are advanced with respect to the clock signal.

Because it is necessary to recombine the data streams, it is necessary to synchronize the data streams on the different lanes of the multilane link with each other so that they can be multiplexed or combined to form a single data stream. As described above, this is accomplished by clocking the data streams 309 into deskew buffers 312 using recovered clock signals from each of the data streams, and then clocking the data out of the deskew buffers using a single, common clock signal. Since clock signal A is not available at the destination end of the multilane link, one of the recovered clock signals is used to clock the data out of each of the deskew buffers.

Figure 4D:
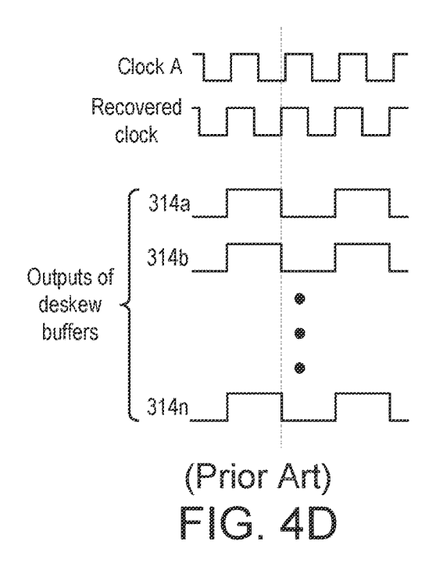

As shown in FIG. 3, the recovered clock signal from clock recovery unit 310a is used to clock data out of each of deskew buffers 312. Consequently, each of the data streams 314 that is clocked out of data buffers 312 is synchronized with this recovered clock signal as shown in FIG. 4D. Clock signal A is also depicted in this figure to show that the recovered clock signal need not be synchronized with clock signal A. It should be noted that, while the recovered clock signal from clock recovery unit 310a is used in this example to clock data out of each of deskew buffers 312, the clock signal from any one of clock recovery units 310a-310n could be used for this purpose.

Figure 4E:
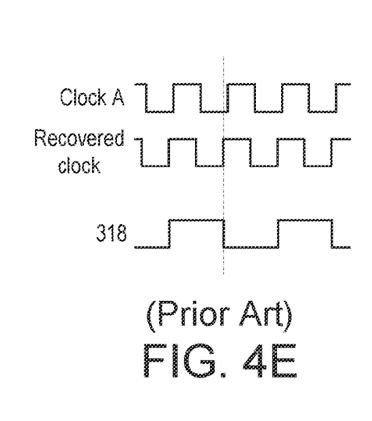

Referring to FIG. 4E, data streams 314 which are received by multiplexer 316 are combined to form a single data stream 318 which is a reconstruction of original data stream 300. Because demultiplexer 316 is clocked by the recovered clock signal, data stream 318 is synchronized with the recovered clock signal. Again, clock signal A is shown for reference to illustrate that the recovered clock signal and synchronized data stream 318 need not be in phase with clock signal A.

Figure 4F:
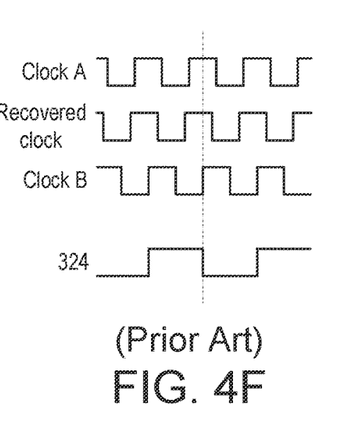

Because data stream 318 is synchronized with the recovered clock signal, which may be out of phase with the clock signal (clock signal B) of the destination clock domain, it is necessary to synchronize data stream 318 with clock signal B. This is accomplished by clocking the data of data stream 318 into clock domain crossing (CDC) buffer 320 using the recovered clock signal, and then clocking the data out of the CDC buffer using clock signal B of the destination clock domain. As a result, data stream 324 which is clocked out of the CDC buffer is synchronized with clock B of the destination clock domain, which may be out of phase with both clock signal A and the recovered clock signal, as shown in FIG. 4F.

Figure 5:
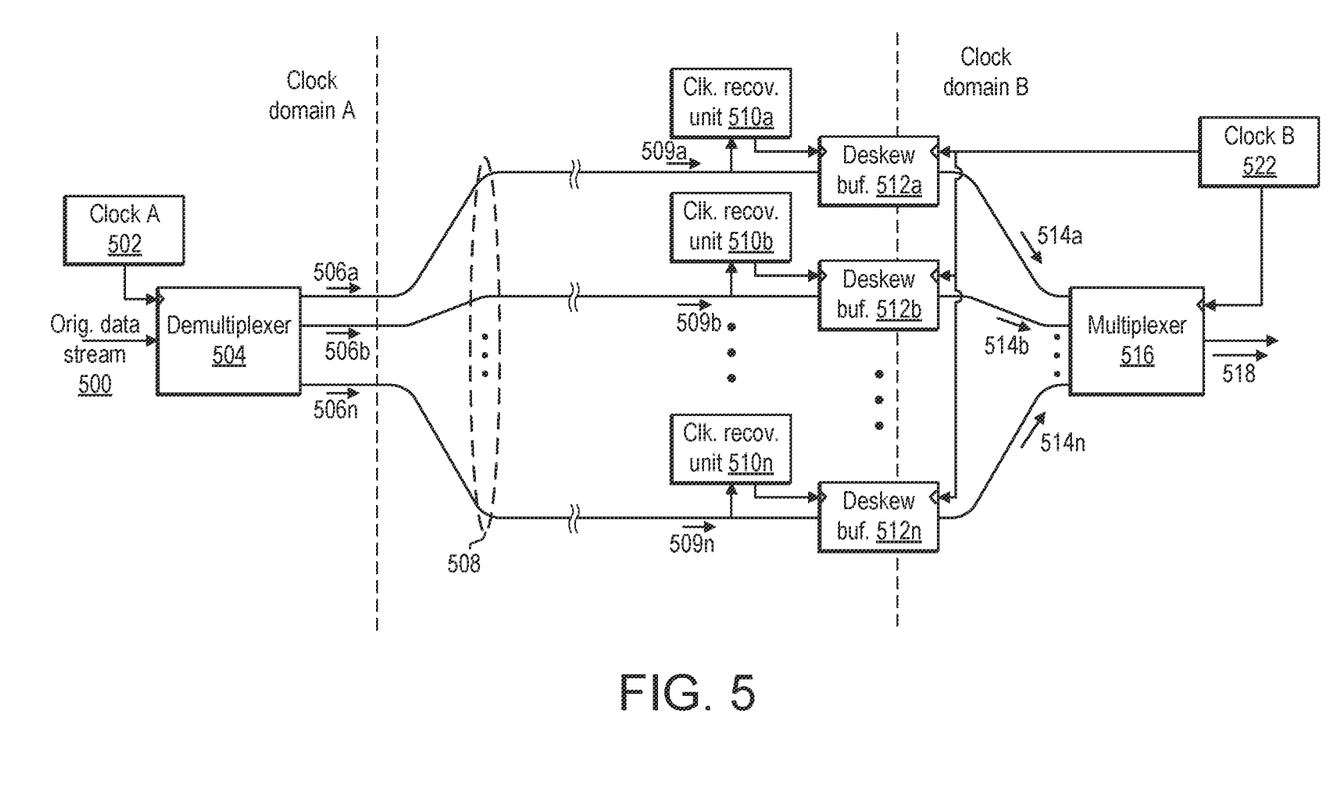
FIG. 5 is a diagram illustrating an example clock domain crossing mechanism in accordance with the disclosed embodiments.

Referring to FIG. 5, an example clock domain crossing mechanism in accordance with the disclosed embodiments is shown. In this example, data is communicated from a first (source) clock domain of a first (source) device to a second (target) clock domain of a second (target) device via a multilane data link.

An original data stream 500 is provided to a demultiplexer 504 which is clocked by a source clock signal from source clock 502. Demultiplexer 504 separates the data of original data stream 500 into multiple, separate data streams 506. Each of data streams 506 is transmitted in parallel with the other data streams 506 on a corresponding lane of multilane link 508.

As noted above, there are at least minor differences between the physical lanes of multilane link 508, so the different lanes require different amounts of time to transmit the corresponding data streams from the source end of the link to the destination end of the link. As a result, each of the data streams 509 may be out of phase with each other when they reach the destination end of multilane link 508.

It is therefore necessary to synchronize each of the data streams so that they can be recombined (multiplexed) to reform the original data stream. This is accomplished by clocking each of data streams 509 into deskew buffers 512 using the corresponding recovered clock signals that are generated by the corresponding clock recovery units 510, and then clocking the data out of the deskew buffers using a single, common clock signal.

Up to the point at which the data streams are clocked into the deskew buffers using the corresponding recovered clock signals, the system of FIG. 5 is the same as the system of FIG. 3. The designs diverge, however, at the point at which the data is clocked out of deskew buffers 512. In the disclosed embodiments, the data is clocked out of the deskew buffers using clock signal B 522, which is the clock signal of the destination clock domain. Data streams 514 are therefore synchronized with the clock signal of the destination clock domain, rather than being synchronized with one of the recovered clock signals, as in the system of FIG. 3.

Synchronized data streams 514 are recombined by demultiplexer 516 into a single data stream 518 which is identical to original data stream 500, except that data stream 518 is synchronized with clock signal B of the destination clock domain. Because data stream 518 is already synchronized with clock signal B, there is no need to use a CDC buffer to synchronize the data stream with the destination clock domain and complete the clock domain crossing. This eliminates the clock cycles that are required in the system of FIG. 3 to process data stream 324 through CDC buffer 320 and thereby shortens the amount of time required to make the clock domain crossing from the source clock domain to the destination clock domain. It also simplifies the clock domain crossing system itself, as it is not necessary to provide a separate clock domain crossing buffer.

It should be noted that, although the example of FIG. 5 includes the components of the source device (particularly clock 502 and demultiplexer 504) and multilane link 508 in addition to the components of the destination device, some of the disclosed embodiments may include only the destination device (clock recovery units 510, deskew buffers 512, multiplexer 516 and clock 522).

Referring to FIGS. 6A-6E, a series of diagrams are shown to illustrate the relative timing of the clock signals at the different stages of the clock domain crossing system of FIG. 5. Each diagram illustrates the timing of the data stream(s) with the various clock signals that are involved in the clock domain crossing.

Figure 6A:
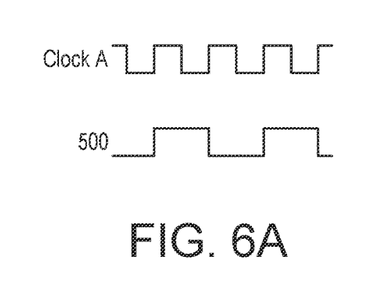
FIGS. 6A-6E are diagrams illustrating the relative timing of the clock signals at the different stages of the clock domain crossing system of FIG. 5.

Referring to FIG. 6A, the clock signal of the source domain and the data stream 500 that is to be transmitted from the source clock domain to the target clock domain are depicted. Clock signal A of the source clock domain is provided by clock 502. Data stream 500, which is synchronized with clock signal A is input to demultiplexer 504, which is clocked by clock signal A.

Figure 6B:
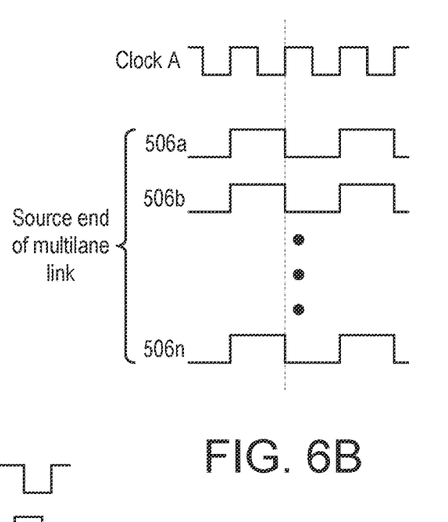

Referring to FIG. 6B, demultiplexer 504 processes received data stream 500 and separates this data stream into a set of data streams 506a-506n, which are synchronized with clock signal A when they are generated by demultiplexer 504. Demultiplexer 504 provides synchronized data streams 506a-506n to multilane link 508 for transmission to the second device, which has a different clock domain based on clock signal B.

Figure 6C:
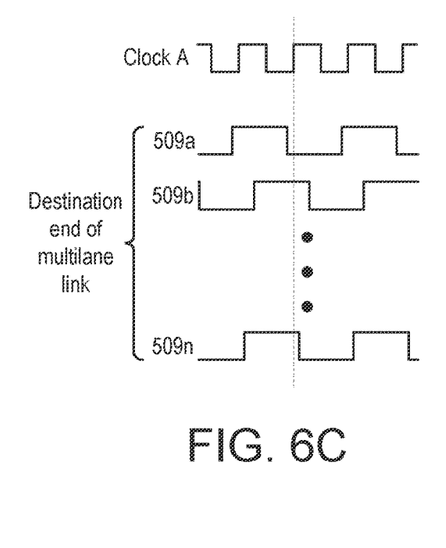

Because the different lanes of multilane link 508 may each be slightly different, the data streams transmitted via the different lanes may not remain synchronized. Thus, when the data streams reach the destination end of multilane link 508, the data streams may be out of phase with each other as shown in FIG. 6C. As depicted in this figure, data stream 509a is delayed by a small amount from the clock signal, while data streams 509b and 509n are advanced with respect to clock signal A.

Figure 6D:
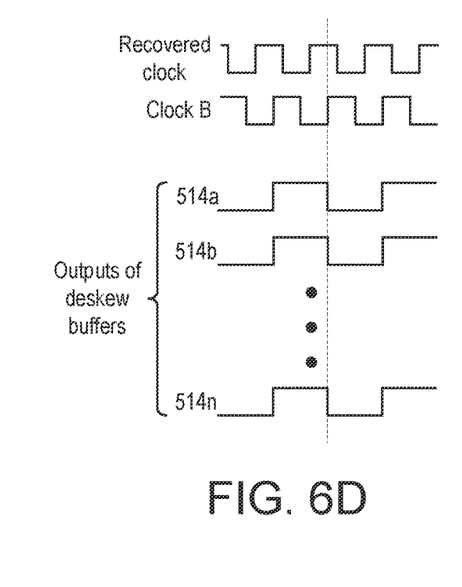

Because the data streams received at the destination end of multilane link 508 may be out of phase, it is necessary to synchronize the data streams before recombining them. The data streams are therefore processed through deskew buffers 512. Unlike the conventional system of FIG. 3, the embodiment of FIG. 5 uses the clock signal of the destination clock domain to clock the data out of deskew buffers 512. As a result, data streams 514 which are read out of deskew buffers 512 are synchronized with clock signal B of the destination clock domain as shown in FIG. 6D. In other words, the clock domain crossing has been completed.

Figure 6E:
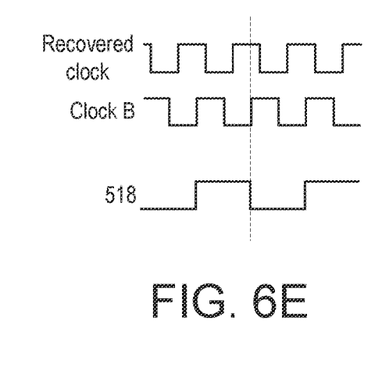

Although the clock domain crossing has been completed, it is still necessary to recombine data streams 514 into a single data stream. Data streams 514 are therefore processed through demultiplexer 516, which generates output data stream 518, which is identical to original data stream 500, except that data stream 518 is synchronized with clock signal B of the destination clock domain, as shown in FIG. 6E.

Figure 7:
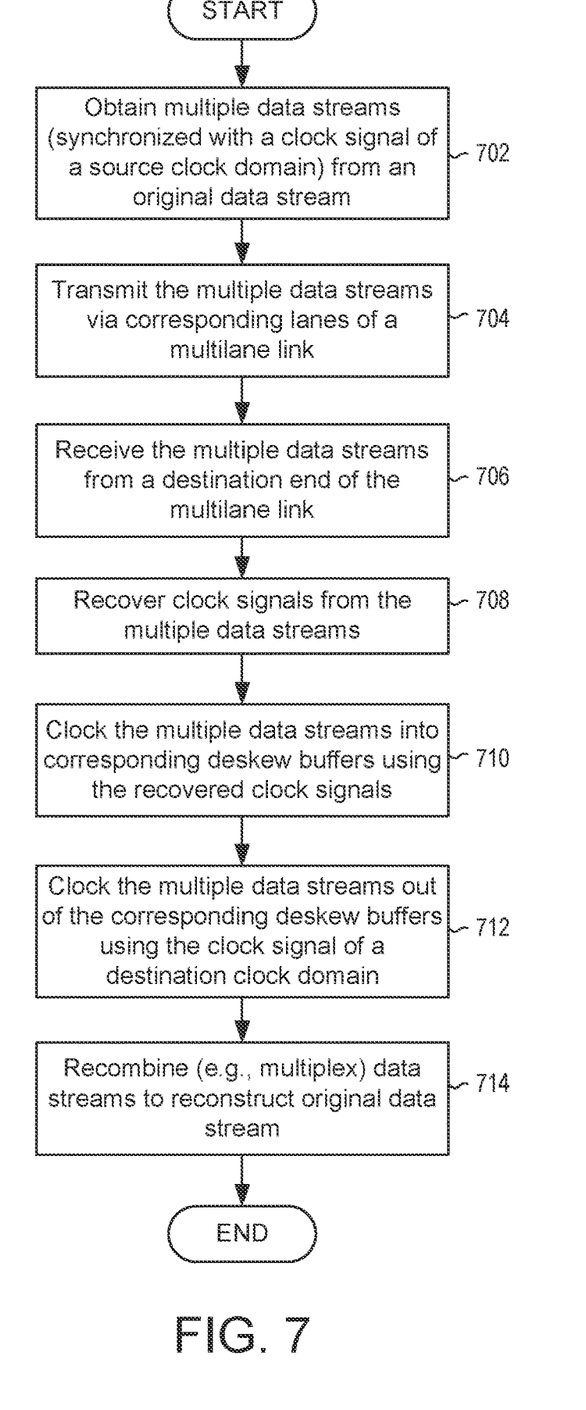
FIG. 7 is a diagram illustrating an example method for making a clock domain crossing in accordance with some embodiments.

In addition to the example described above, disclosed embodiments also include methods for making clock domain crossings. Referring to FIG. 7, a diagram is shown to illustrate an example method for making a clock domain crossing in accordance with some embodiments.

Referring to FIG. 7, at step 702, multiple data streams (which may be referred to as sub-data streams) are obtained from an original data stream in a first clock domain. This may comprise, for example, demultiplexing the original data stream in a first device, where bits from the original data stream are distributed among the different sub-data streams. At step 704, the multiple sub-data streams are transmitted via the different lanes of a multilane link that is connected to the first device. In other words, when the sub-data streams are generated, each sub-data stream is provided to a different one of the lanes of the multilane link so that it can be transmitted via that lane.

The disclosed embodiments do not involve steps 702 and 704, which correspond to the generation of the data streams in the first (transmitting) device and the transmission of the data streams over the multilane link. The disclosed embodiments instead function within the second (receiving) device. At step 706, the multiple sub-data streams are received by the second device connected to a destination end of the multilane link. At 708, the receiving device recovers clock signals from each of the multiple sub-data streams. A separate clock signal is recovered from each of the sub-data streams because each of the sub-data streams may be out of phase with the others.

At step 710, the multiple sub-data streams are clocked into corresponding deskew buffers using the recovered clock signals. Each sub-data stream is clocked into a corresponding deskew buffer using the clock signal recovered from that same data stream (which is necessary to ensure that the clock signal used to clock the data into the deskew buffer is synchronized with the sub-data stream).

At step 712, the data stored in the deskew buffers is clocked out of the buffers using the clock signal of the destination clock domain. This same clock signal is used to clock the data out of all of the deskew buffers. This serves two purposes: to synchronize the sub-data streams with each other; and to synchronize the sub-data streams with the clock signal of the receiving device's clock domain.

At step 714, the sub-data streams are combined to reconstruct the original data stream. Since the sub-data streams have already been synchronized with the destination clock domain, there is no need to process the reconstructed data stream (or the sub-data streams) through a separate clock domain crossing buffer to synchronize the data stream(s) with the destination clock signal.

While embodiments described herein have been described with respect to a limited number of embodiments, those skilled in the art, having the benefit of this detailed description, will appreciate that other embodiments can be devised which do not depart from the scope of embodiments as disclosed herein.

One embodiment comprises a multilane clock crossing apparatus having a plurality of FIFO deskew buffers and a multiplexer. Each deskew buffer receives and buffers a data stream from a corresponding lane of a multilane link. For each deskew buffer, the corresponding data stream is clocked into the deskew buffer using a recovered clock signal corresponding to the data stream, where the recovered clock signal is independent of a destination clock domain. For each deskew buffer, the data stream is clocked out of the deskew buffer using a target clock signal of the destination clock domain. The descrambler receives the data stream clocked out of each deskew buffer and reorders data of the data streams to generate a single combined data stream containing the data of the data streams.

In some embodiments, the apparatus includes one or more clock recovery units that receive each of the data streams from the corresponding lanes of the multilane link and recover a corresponding recovered clock signal for each of the data streams.

In some embodiments, the plurality of deskew buffers and the descrambler are contained in a network device which is coupled to the multilane link, where the network device generates the target clock signal that defines the destination clock domain.

In some embodiments, the multilane link is connected to a transmitting device that generates the data streams using a source clock signal of a source clock domain which is independent of the destination clock domain. The transmitting device transmits the data streams via the multilane link. The data streams generated by the transmitting device are synchronized to the source clock signal of the transmitting device.

In some embodiments, the transmitting device includes a demultiplexer that generates the data streams from a single original data stream, and the descrambler of the receiving device comprises a multiplexer.

In some embodiments, the lanes of the multilane link have physical differences that skew the phases of the data streams that are transmitted via different ones of the lanes.

Another embodiment comprises a multilane clock crossing apparatus having a plurality of FIFO deskew buffers, where each deskew buffer receives and buffers a corresponding one of the plurality of data streams from a corresponding lane of the multilane link. Each data stream is clocked into the corresponding deskew buffer using a recovered clock signal recovered from that data stream. The recovered clock signal is independent of a destination clock domain. Each data stream is then clocked out of the corresponding deskew buffer using a destination clock signal of the destination clock domain.

The apparatus may include processing logic that receives the data stream from each deskew buffer, where the processing logic is clocked by the destination clock signal. In some embodiments, the processing logic comprises a descrambler that receives the data stream from each deskew buffer, where the descrambler reorders data of the data streams and generates a single combined data stream containing the data of the data streams.

In some embodiments, the plurality of deskew buffers and the descrambler are contained in a network device which is coupled to the multilane link, where the network device generates the destination clock signal that defines the destination clock domain.

In some embodiments, the apparatus includes one or more clock recovery units that receive each of the data streams from the corresponding lanes of the multilane link and recover, for each of the data streams, the corresponding recovered clock signal.

In some embodiments, the multilane link is connected to a transmitting device that generates the data streams using a source clock signal of a source clock domain which is independent of the destination clock domain and transmits the data streams via the multilane link. The data streams generated by the transmitting device are synchronized to a clock signal of a clock domain of the transmitting device, and phases of the data streams are skewed by the lanes of the multilane link. The data streams may be generated by demultiplexing an original data stream, where a multiplexer receives the data stream from each deskew buffer, and where the multiplexer is clocked by the destination clock signal. The multiplexer reorders data of the data streams and generates a single combined data stream containing the data of the data streams.

Another embodiment comprises a method which includes receiving, at a destination device, a plurality of data streams from a source device. The destination device has a destination clock domain and the source device has a source clock domain which is independent of the destination clock domain. Each of the plurality of data streams is received via a corresponding lane of a multilane data link. For each of the received data streams, a corresponding clock signal is recovered from the received data stream. The data of each received data stream is clocked into a corresponding deskew buffer using the recovered clock signal from the received data stream. The data of each received data stream is clocked out of the corresponding deskew buffer using a destination clock signal of the destination clock domain. The same destination clock signal is used to clock data out of each deskew buffer, so that each data stream is synchronized with the destination clock signal.

In some embodiments, recovering the corresponding clock signal from each received data stream comprises providing the plurality of data streams to one or more clock recovery units that are connected to a destination end of the multilane link, where the clock recovery units derive from each data stream a corresponding recovered clock signal that is synchronized with the corresponding data stream.

In some embodiments, the method is performed automatically in a network device which is coupled to a destination end of the multilane link, the network device generating the target clock signal that defines the destination clock domain.

In some embodiments, the method includes generating, in a transmitting device connected to a source end of the multilane link, the plurality of data streams. The data streams are generated using a source clock signal of the transmitting device which is independent of the destination clock signal domain. The data streams are then provided to the multilane link. The data streams are transmitted via the multilane link, which skews the phases of the data streams with respect to each other.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments disclosed herein will be employed without a corresponding use of other features, and features described with respect to one embodiment may be combined with features of other embodiments without departing from the scope and spirit of the disclosure as set forth herein.

What is claimed is:

1. A multilane clock crossing apparatus comprising:
a plurality of FIFO deskew buffers, wherein each deskew buffer receives and buffers a data stream from a corresponding lane of a multilane link;
wherein for each deskew buffer,
the corresponding data stream is clocked into the deskew buffer using a recovered clock signal corresponding to the data stream, wherein the recovered clock signal is independent of a destination clock domain, and
the data stream is clocked out of the deskew buffer using a target clock signal of the destination clock domain; and
a multiplexer that receives from each deskew buffer the corresponding data stream, wherein the multiplexer is clocked by the target clock signal, wherein the multiplexer generates a single combined data stream containing the data of the data streams.

2. The apparatus of claim 1, further comprising one or more clock recovery units that receive each of the data streams from the corresponding lanes of the multilane link and recover, for each of the data streams, a corresponding recovered clock signal.

3. The apparatus of claim 1, wherein the plurality of deskew buffers and the multiplexer are contained in a network device which is coupled to the multilane link, wherein the network device generates the target clock signal that defines the destination clock domain.

4. The apparatus of claim 1, wherein the multilane link is connected to a transmitting device that generates the data streams using a source clock signal of a source clock domain which is independent of the destination clock domain and transmits the data streams via the multilane link.

5. The apparatus of claim 4, wherein the data streams generated by the transmitting device are synchronized to the clock signal of the source clock domain of the transmitting device.

6. The apparatus of claim 4, wherein the lanes of the multilane link have physical differences that skew respective phases of the data streams that are transmitted via different ones of the lanes of the multilane link.

7. The apparatus of claim 1, wherein the transmitting device comprises a demultiplexer that generates the data streams from a single original data stream.

8. A multilane clock crossing apparatus comprising:
a plurality of FIFO deskew buffers, wherein each deskew buffer receives and buffers a corresponding one of the plurality of data streams from a corresponding lane of the multilane link;
wherein for each deskew buffer,
the corresponding data stream is clocked into the deskew buffer using a corresponding recovered clock signal recovered from the data stream corresponding to the deskew buffer, wherein the recovered clock signal is independent of a destination clock domain, and
the data stream is clocked out of the deskew buffer using a destination clock signal of the destination clock domain.

9. The apparatus of claim 8, further comprising processing logic that receives from each deskew buffer the corresponding data stream, wherein the processing logic is clocked by the destination clock signal.

10. The apparatus of claim 9, wherein the processing logic comprises a multiplexer that receives from each deskew buffer the corresponding data stream, wherein the multiplexer is clocked by the destination clock signal, wherein the multiplexer generates a single combined data stream containing the data of the data streams.

11. The apparatus of claim 10, wherein the plurality of deskew buffers and the multiplexer are contained in a network device which is coupled to the multilane link, wherein the network device generates the destination clock signal that defines the destination clock domain.

12. The apparatus of claim 8, further comprising one or more clock recovery units that receive each of the data streams from the corresponding lanes of the multilane link and recover, for each of the data streams, the corresponding recovered clock signal.

13. The apparatus of claim 8, wherein the multilane link is connected to a transmitting device that generates the data streams using a source clock signal of a source clock domain which is independent of the destination clock domain and transmits the data streams via the multilane link.

14. The apparatus of claim 13, wherein the data streams generated by the transmitting device are synchronized to a clock signal of a clock domain of the transmitting device, and wherein phases of the data streams are skewed by the lanes of the multilane link.

15. The apparatus of claim 13, wherein the data streams are generated by demultiplexing an original data stream, the apparatus further comprising a multiplexer that receives from each deskew buffer the corresponding data stream, wherein the multiplexer is clocked by the destination clock signal, wherein the multiplexer reorders data of the data streams and generates a single combined data stream containing the data of the data streams.

16. A method comprising:
receiving, at a destination device having a destination clock domain, a plurality of data streams from a source device having a source clock domain which is independent of the destination clock domain, each of the plurality of data streams being received via a corresponding lane of a multilane data link; and
for each of the plurality of received data streams,
recovering a corresponding recovered clock signal from the received data stream, and
clocking data of the received data stream into a corresponding deskew buffer using the recovered clock signal from the received data stream; and
clocking data of the received data stream out of corresponding deskew buffer using a destination clock signal of the destination clock domain, thereby generating a corresponding generated data stream that is synchronized with the destination clock signal.

17. The method of claim 16, wherein recovering the corresponding recovered clock signal from each received data stream comprises providing the plurality of data streams to one or more clock recovery units that are connected to a destination end of the multilane link, the one or more clock recovery units deriving from each data stream a corresponding recovered clock signal that is synchronized with the corresponding data stream.

18. The method of claim 16, wherein the method is performed automatically in a network device which is coupled to a destination end of the multilane link, the network device generating the target clock signal that defines the destination clock domain.

19. The method of claim 16, further comprising generating, in a transmitting device connected to a source end of the multilane link, the plurality of data streams using a source clock signal of the transmitting device which is independent of the destination clock signal domain, and providing the data streams to the multilane link.

20. The method of claim 19, further comprising transmitting, via the multilane link, the data streams generated by the transmitting device, wherein the transmitting the data streams via the corresponding lanes of the multilane link skews phases of the data streams with respect to each other.

* * * * *